(12) United States Patent
Tsuda

(10) Patent No.: US 7,418,153 B2
(45) Date of Patent: Aug. 26, 2008

(54) ELECTRONIC CAMERA

(75) Inventor: Yutaka Tsuda, Yokohama (JP)

(73) Assignee: Nikon Corporation, Tokyo (JP)

( * ) Notice: Subject to any disclaimer, the term of this patent is extended or adjusted under 35 U.S.C. 154(b) by 441 days.

(21) Appl. No.: 11/249,280

(22) Filed: Oct. 14, 2005

(65) Prior Publication Data

US 2006/0082660 A1 Apr. 20, 2006

(30) Foreign Application Priority Data

Oct. 20, 2004 (JP) .............................. 2004-305969

(51) Int. Cl.
*G06K 9/40* (2006.01)
(52) U.S. Cl. .............. 382/266; 348/E3.02; 348/E5.081; 348/222.1
(58) Field of Classification Search .............. 348/222.1, 348/E3.02, E5.081; 382/266; 386/E5.081
See application file for complete search history.

(56) References Cited

U.S. PATENT DOCUMENTS

| | | | |
|---|---|---|---|
| 6,084,634 A | | 7/2000 | Inagaki et al. |
| 6,181,375 B1* | | 1/2001 | Mitsui et al. ........... 348/240.99 |
| 6,272,239 B1* | | 8/2001 | Colla et al. .................. 382/167 |
| 6,970,193 B1* | | 11/2005 | Kidono et al. .............. 348/245 |
| 7,050,500 B2* | | 5/2006 | Sun et al. ............... 375/240.16 |
| 7,092,012 B2* | | 8/2006 | Nakamura et al. ........ 348/211.3 |
| 7,271,851 B2* | | 9/2007 | Lin et al. ..................... 348/631 |
| 2002/0140830 A1* | | 10/2002 | Shirakawa et al. .......... 348/245 |

FOREIGN PATENT DOCUMENTS

| | | |
|---|---|---|
| EP | 1 569 442 A1 | 12/2003 |
| JP | A-7-15653 | 1/1995 |
| JP | A-9-135388 | 5/1997 |
| WO | WO 2004/032484 A1 | 4/2004 |
| WO | WO 2004/051987 A1 | 6/2004 |

\* cited by examiner

*Primary Examiner*—Samir A. Ahmed
*Assistant Examiner*—Stephen R Koziol
(74) *Attorney, Agent, or Firm*—Oliff & Berridge, PLC

(57) ABSTRACT

An electronic camera includes an image pickup device, a partial image area position detecting section, a maximal image correcting value output section, and an image processing section. The image pickup device includes a light-receiving plane photoelectrically converting a subject image, and reads any partial image area from a maximal image area used to generate an image with maximum pixel numbers on the plane. The partial image area position detecting section detects positional data on the partial image area according to the maximal image area. The maximal image correcting value output section outputs maximal image correcting values, that are set based on the entire characteristic of the maximal image area and used for image processing image signals of the maximal image area. The image processing section extracts applied correcting values based on positional data and performs image processing on image signals of the partial image area using the applied correcting values.

4 Claims, 3 Drawing Sheets

IF GAIN VALUES ARE DETERMINED USING LUMINANCE INFORMATION ON ABOVE PARTIAL IMAGE AREA 1 AND PARTIAL IMAGE AREA 2, EXPOSURES GREATLY DIFFER FROM THAT OF ENTIRE IMAGE

ELECTRONIC CAMERA

CROSS REFERENCE TO RELATED APPLICATION

This application is based upon and claims the benefit of priority from Japanese Patent Application No. 2004-305969, filed on Oct. 20, 2004, the entire contents of which are incorporated herein by reference.

BACKGROUND OF THE INVENTION

1. Field of the Invention

The present invention relates to image processing of an electronic camera capable of partially reading out image signals from an image pickup device.

2. Description of the Related Art

An electronic camera which partially reads out any random partial image area from a maximal image area of an image pickup device and generates image data is conventionally and publicly known. For example, Japanese Unexamined Patent Application Publication No. Hei 9-135388 (paragraph [0187] and FIG. 52) discloses a technique of removing fixed pattern noise caused by a dark current component in the electronic camera capable of partial readout from the image pickup device.

However, image processing (such as line crawling correction, luminance shading correction, gain correction, gamma correction, color matrix calculation, or the like) with a conventional electronic camera was performed with a parameter based on a characteristic of the partial image area in partial readout, with no consideration given to characteristics other than that of the partial image area. Accordingly, if the same subject is photographed under the same photographing condition in partial readout and all pixel readout, a partial image subjected to the image processing in the partial readout and an entire image generated in the all pixel readout would differ and give the photographs a sense of incongruity.

If the partial image is generated by being cut out of the entire image, the above incongruity between the partial image and the entire image is resolved. However, in this case, the entire image needs to be generated with the all pixel readout in order to generate the partial image. This is inefficient since this would drastically increase the processing time required to generate the partial image. Moreover, the technique in Japanese Unexamined Patent Application Publication No. Hei 9-135388 merely stores beforehand the data on fixed pattern noise in an area wider than the partial image area to prevent the data from being re-fetched. This is done as a measure for preventing reduction of frame rate for when the partial image area is changed. Accordingly, the technique in Japanese Unexamined Patent Application Publication No. Hei 9-135388 does not resolve the above-described problem at all.

SUMMARY OF THE INVENTION

The present invention is made to solve the above-described problem in the conventional art, and its object is to provide an electronic camera capable of generating a partial image by partial readout, in which the partial image gives no sense of incongruity even when it is compared to an entire image generated by all pixel readout.

An electronic camera of the present invention comprises an image pickup device, a partial image area position detecting section, a maximal image correcting value output section, and an image processing section. The image pickup device includes a light-receiving plane which photoelectrically converts a subject image. The image pickup device allows any random partial image area to be read out from a maximal image area used to generate an image with a maximum number of pixels on the light-receiving plane. The partial image area position detecting section detects positional data on the partial image area with respect to the maximal image area. The maximal image correcting value output section outputs maximal image correcting values. The maximal image correcting values are set based on an entire characteristic of the maximal image area and are used for image processing of image signals of the maximal image area. The image processing section extracts applied correcting values based on the positional data. Here, the applied correcting values are correcting values of the maximal image correcting values at a position corresponding to the partial image area. The image processing section performs image processing on image signals of the partial image area using the applied correcting values.

Moreover, it is desirable that the electronic camera of the present invention further comprise a partial image correcting value output section and an image processing mode selecting section. The partial image correcting value output section outputs partial image correcting values. The partial image correcting values are correcting values that are set based on a characteristic of a selected partial image area and are optimized for image processing of the partial image area. The image processing mode selecting section selects one of the applied correcting values and the partial image correcting values, as correcting values used in the image processing section.

Further, it is particularly desirable that the image processing of the electronic camera of the present invention relate to any of line crawling correction, luminance shading correction, gain correction, gamma correction, and color matrix calculation.

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

DESCRIPTION OF THE PREFERRED EMBODIMENT

<Description on Configuration of Electronic Camera>

Figure 1:
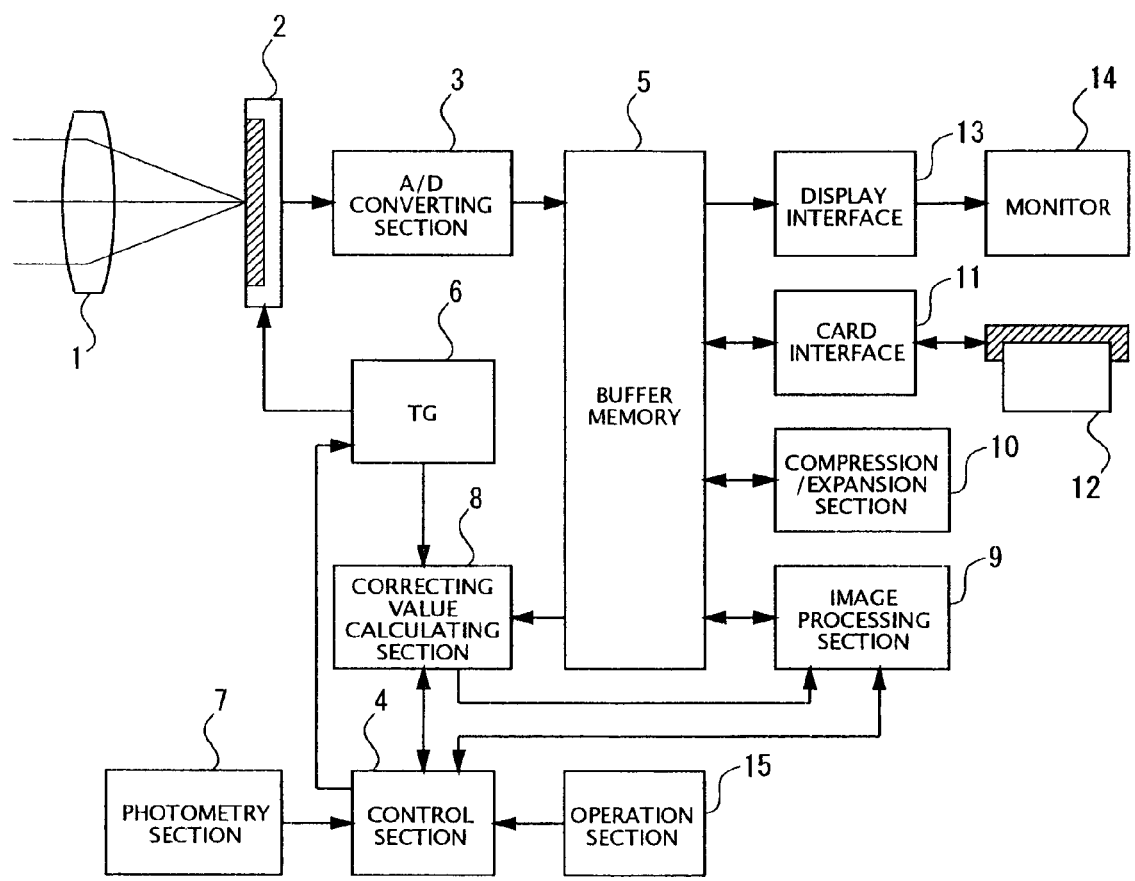
FIG. 1 is a functional block diagram of an electronic camera of the embodiment of the present invention.

FIG. 1 is a functional block diagram of an electronic camera of an embodiment in the present invention. The electronic camera of this embodiment includes a photographing lens 1, an image pickup device 2, an A/D converting section 3, a control section 4, a buffer memory 5, a timing generator (TG) 6, an photometry section 7, a correcting value calculating section 8, an image processing section 9, a compression/expansion section 10, a card interface 11, a record medium 12, a display interface 13, a monitor 14, and an operation section 15.

The image pickup device 2 is placed on the image space side of the photographing lens 1. Photo detectors, which photoelectrically convert a subject image to generate analog image signals, are two-dimensionally arranged on a surface (a light-receiving plane) of the image pickup device 2 facing the photographing lens 1. Placed on the light-receiving plane of the image pickup device 2 is a color filter array in which color filters to transmit respective red (R), green (B), and blue (B) lights through are arranged regularly. Therefore, the subject image is converted into R, G, and B image signals by the image pickup device 2. Also, analog image signals outputted from the image pickup device 2 are converted into digital image signals by the A/D converting section 3.

The image pickup device 2 of this embodiment is an XY address-type image pickup device (such as a CMOS) and can read out an image signal of an addressed photo detector in random access. Namely, the image pickup device 2 of this embodiment can be driven by either all pixel readout or partial readout. In the all pixel readout, all image signals of a maximal image area (a pixel area used to generate an image with a maximum number of pixels by the electronic camera) of the image pickup device 2 are read out. On the other hand, in the partial readout, image signals of any random partial image area in the above-described maximal image area are read out.

The control section 4 controls respective sections of the electronic camera by executing designation of the partial image area in the image pickup device 2, various kinds of calculation processing necessary for AE calculation and AF calculation, and so on.

In particular, in this embodiment, the control section 4 executes mode selection between "a normal photographing mode" and "a partial image area photographing mode". In "the normal photographing mode", the control section 4 performs photographing of the maximal image area by the all pixel readout. In "the partial image area photographing mode", the control section 4 performs photographing by the partial readout of a partial image area designated by a photographer. Moreover, in "the partial image area photographing mode", the control section 4 executes selection between image processing conforming to the normal photographing mode and image processing optimized for the partial image area.

The buffer memory 5 is composed of an SDRAM or the like. This buffer memory 5 includes a data area which can temporarily store image signals before image processing or image data after image processing. In the buffer memory 5, parameters to calculate correcting values of the maximal image area regarding line crawling correction (correction of unevenness due to difference in photosensitive characteristic among photo detectors), luminance shading correction (correction of luminance unevenness due to difference in received light amount among photo detectors), gamma correction, and color matrix calculation are recorded.

The above-described parameters are set based on characteristics of the maximal image area. More specifically, regarding the line crawling correction and the luminance shading correction, data on arithmetic expressions which approximately show a line crawling characteristic and a luminance shading characteristic of the maximal image area are held in the buffer memory 5. Regarding the gamma correction and the color matrix calculation, a gamma table and a color matrix table of parameters corresponding to the maximal image area are held in the buffer memory 5.

The timing generator 6 generates driving signals necessary for operations of discharging unnecessary charges of photo detectors, storing charges, outputting stored charges, and so on in predetermined timing, and supplies the respective driving signals to the image pickup device 2. In "the partial image area photographing mode", the timing generator 6 outputs a correspondence (positional data on the partial image area) between image signals read out from the image pickup device 2 and addresses of photo detectors to the correcting value calculating section 8.

The photometry section 7 is composed of a CCD or the like, and divides a field into plural areas and meters them. Each area of this photometry section 7 corresponds to a part of the maximal image area in the image pickup device 2. The photometry section 7 outputs luminance information on each area to the control section 4. The luminance information of the photometry section 7 is used for AE calculation in the control section 4, and correcting values for gain correction are generated based on the result of this calculation. Also, in the electronic camera configured to perform multi-pattern metering by reading out the image signals of the image pickup device 2 at regular intervals, the photometry section 7 can be omitted.

The correcting value calculating section 8 calculates correcting values for the line crawling correction, the luminance shading correction, the gain correction, the gamma correction, and the color matrix calculation and outputs them to the image processing section 9. Also, in "the partial image area photographing mode", the image processing section 9 calculates correcting values based on the positional data on the partial image area.

The image processing section 9 performs various kinds of image processing such as defect correction, line crawling correction, luminance shading correction, gain correction, color interpolation, edge enhancement, gamma correction, and color matrix calculation on image signals corresponding to one screen which are temporarily stored in the buffer memory and generates image data. Incidentally, regarding the line crawling correction, the luminance shading correction, the gain correction, the gamma correction, and the color matrix calculation, the image processing section 9 of this embodiment executes the image processing based on the correcting values outputted from the correcting value calculating section 8.

The compression/expansion section 10 executes processing of compressing image data after image processing in a JPEG format and processing of expanding and reconstructing image data compressed in the JPEG format. The record medium 12 is removably attached to the card interface 11. For example, a card-type record medium with a built-in flash memory or the like corresponds to this record medium 12, and the image data compressed by the compression/expansion section 10 is finally stored therein.

The monitor 14 is connected to the display interface 13. A display of regenerated photographed image data and various kinds of displays at the time of setting are performed on the monitor 14. The operation section 15 is composed, for example, of a command dial, a cross-shaped cursor key, and so on, and used for various kinds of selection inputs, for example, for the above-described mode selection.

<Description on Operation of Electronic Camera>

An image generating operation of the electronic camera of this embodiment will be described below. Incidentally, in the description of the operation, after the description of the operation in "the normal photographing mode", the operation in "the partial image area photographing mode" will be described.

<Operation in Normal Photographing Mode>

In "the normal photographing mode", when the photographer instructs shutter release, for example, by fully pressing a release button not shown, the control section 4 instructs the image pickup device 2 via the timing generator 6 to perform the all pixel readout. Image signals which are sequentially outputted from the image pickup device 2 are temporarily recorded in the buffer memory 5 after being digitalized by the A/D converting section 3.

On the other hand, the correcting value calculating section 8 calculates maximal image correcting values for the line crawling correction, the luminance shading correction, the gain correction, the gamma correction, and the color matrix calculation, and outputs them to the image processing section 9.

For example, in the case of the line crawling correction, the correcting value calculating section 8 reads the following expression (1) from the buffer memory 5, and subscribes coordinates of the photo detectors into the expression (1) in the order read from the image pickup device 2 to calculate correcting values corresponding to the respective photo detectors.

$$f(x, y) = Ax^2 + By^2 + Cxy + Dx + Ey + F \quad (1)$$

Here, A, B, C, D, E, and F are constants stipulated by a line crawling characteristic of the entire maximal image area. The x is a horizontal coordinate of the photo detector in the image pickup device 2 ($1 \leq x \leq$ number of horizontal pixels of the maximal image area). The y is a vertical coordinate of the photo detector in the image pickup device 2 ($1 \leq x \leq$ number of vertical pixels of the maximal image area). Also, in the case of the luminance shading correction, in the same manner as above, the correcting value calculating section 8 sequentially subscribes coordinates of the photo detectors into the arithmetic expression of a luminance shading characteristic to calculate correcting values.

In the case of the gain correction, the control section 4 performs AE calculation in consideration of luminance information on the entire maximal image area and calculates values (correcting values) of gains corresponding to the respective photo detectors of the maximal image area. In the gamma correction and the color matrix calculation, the correcting value calculating section 8 reads out the gamma table and the color matrix table corresponding to the maximal image area from the buffer memory 5, and extracts correcting values based on these tables.

Then, at the stage where image signals corresponding to one screen are recorded in the buffer memory 5, the image processing section 9 performs image processing on the image signals using the above-described maximal image correcting values to generate image data on the maximal image area. The generated image data is compressed in the JPEG format by the compression/expansion section 10 and thereafter stored in the record medium 12. Thus, a series of operations in "the normal photographing mode" is completed.

<Operation in Partial-image Area Photographing Mode>

In "the partial-area photographing mode", before photographing, the photographer previously enters (1) designation of a partial image area and (2) selection of "image processing conforming to the normal photographing mode" or "image processing optimized for the partial image area" to the electronic camera through the operation section 15.

When the photographer instructs shutter release, the control section 4 instructs the image pickup device 2 to perform the partial readout of photo detectors of the designated partial image area. Digital image signals of the partial image area are temporarily recorded in the buffer memory 5. The timing generator 6 outputs positional data on the partial image area to the correcting value calculating section 7.

When the image processing conforming to the normal photographing mode is selected here, the correcting value calculating section 8 extracts applied correcting values based on the parameter used to calculate the maximal image correcting values and the positional data on the partial image area. The applied correcting values correspond to correcting values at a position corresponding to the partial image area extracted from the maximal image correcting values used in "the normal photographing mode".

More specifically, in the case of the line crawling correction, the correcting value calculating section 8 subscribes coordinates of the photo detectors of the partial image area into the above-described expression (1) in the order read to calculate applied correcting values. In the case of the gain correction, the correcting value calculating section 8 calculates values of gains corresponding to the respective photo detectors of the maximal image area in the same manner as in "the normal photographing mode". Thereafter, the correcting value calculating section 8 extracts applied correcting values based on the positional data on the partial image area. Incidentally, also regarding the luminance shading correction, the gamma correction, and the like, the correcting value calculating section 8 generates applied correcting values respectively in the same manner as above.

Note that it is for the following reason that in the partial image area photographing mode, the image processing is performed with the applied correcting values based on a characteristic of the entire maximal image area.

Figure 2:
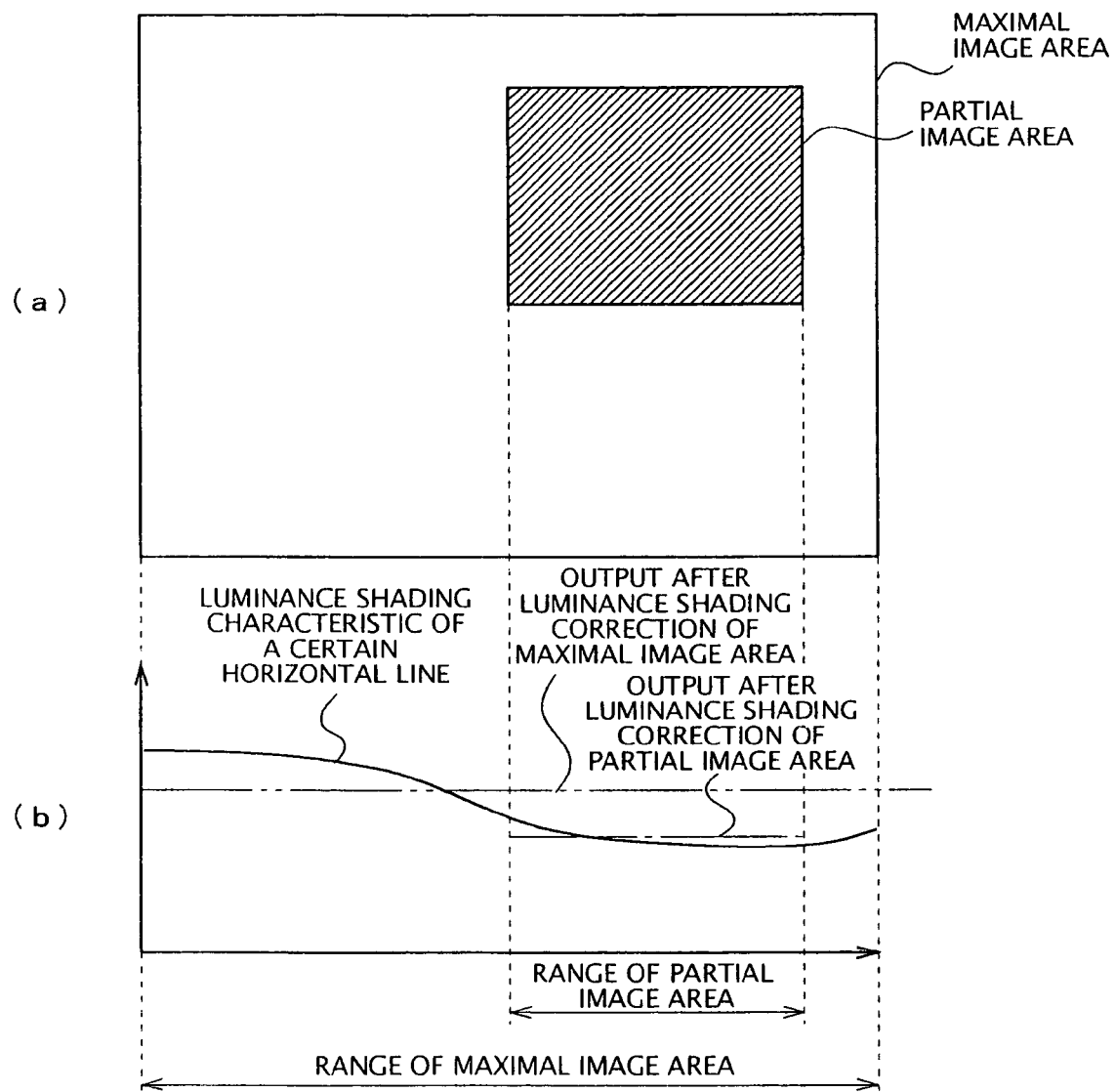
FIG. 2 is an explanatory view indicating a case where outputs after luminance shading correction vary in all pixel readout and partial readout.
Figure 3:
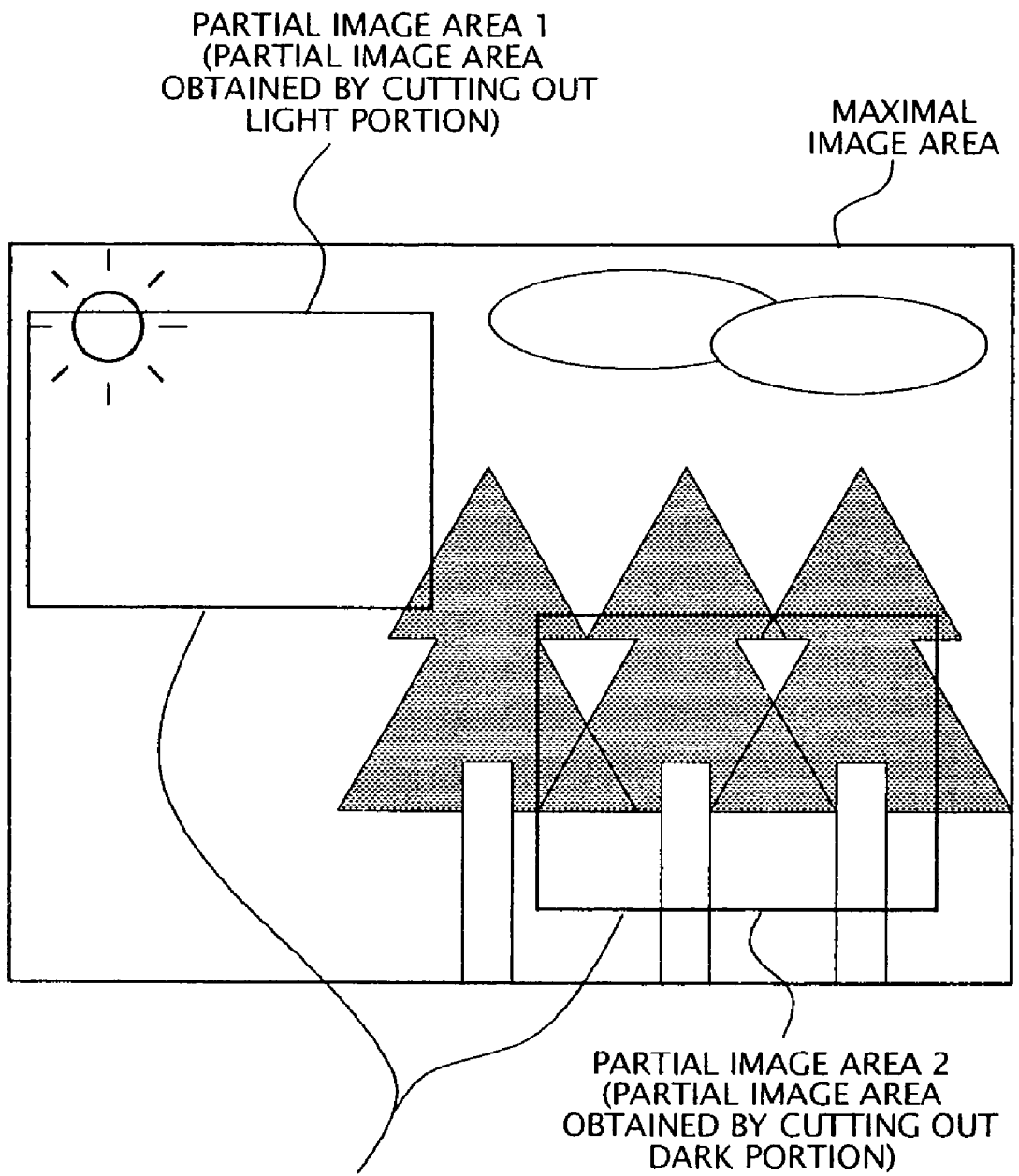
FIG. 3 is an explanatory view indicating a case where correcting values for gain correction vary in all pixel readout and partial readout.

FIG. 2 is an example showing characteristic values of some horizontal line of the luminance shading correction. If the shading correction of the image signals of the partial image area is performed based only on a luminance shading characteristic in the partial image area, in a place where the amplitude of luminance shading in the partial image area is smaller than the amplitude of that in the entire maximal image area, a large divergence occurs between an output after the correction of the partial image area and an output after the correction of the maximal image area. Similarly, if in the determination of gain values, gains are determined with consideration given only to metered values in the partial image area, the image of the partial image area alone is correctly exposed, but its exposure is greatly different as compared with that of the entire image when the same subject is photographed under the same photographing condition in "the normal photographing mode" (See FIG. 3). Namely, if various kinds of correcting values are calculated based only on the characteristic in the partial image area, as compared with the entire image when the same subject is photographed under the same condition in "the normal photographing mode", the photographer sometimes feels a sense of incongruity to the partial image area after the image processing. Therefore, in the present invention, the image processing is performed with the applied correcting values based on the characteristic of the entire maximal image area.

Then, at the stage where all the image signals of the partial image area are recorded in the buffer memory 5, the image processing section 9 performs the image processing on the image signals of the partial image area using the applied correcting values to generate image data (partial image data) on the partial image area. The partial image data in this case corresponds to a part of the entire image when the same subject is photographed under the same photographing condition in the "normal photographing mode". Therefore, when the image processing conforming to the normal photographing mode is selected in "the partial image photographing mode", the partial image data can be generated rapidly by the partial readout, and the partial image which gives no sense of incongruity as compared with the entire image in "the normal photographing mode" can be obtained.

On the other hand, when the image processing optimized for the partial image area is selected in "the partial image area photographing mode", the correcting value calculating section 8 calculates partial image correcting values based on the positional data on the partial image area. The partial image correcting values are calculated based only on a characteristic of the designated partial image area, and characteristics other than that of the partial image area in the maximal image area are not considered.

In the calculation of the partial image correcting values, based on the positional data on the partial image area, the correcting value calculating section 8 may read out partial image correcting values of the corresponding area which are previously recorded in the buffer memory 5, or may directly calculate partial image correcting values based on the positional data on the partial image area. For example, in the case of the gain correction, the control section 4 performs AE calculation using luminance information on the partial image area, and the correcting value calculating section 8 calculates values (correcting values) of gains corresponding to respective photo detectors in the partial image area based on the result of the calculation.

The partial image data subjected to image processing by these partial image correcting values becomes the most suitable image in many cases when the image of the designated partial image area alone is seen (when it is not compared with the entire image). Hence, in the electronic camera of this embodiment, a partial image intended by the photographer can be easily obtained by selection between "the image processing conforming to the normal photographing mode" and "the image processing optimized for the partial image area".

Supplementary Description of Embodiment

As an example, a modification may be made so that in "the partial image area photographing mode" in the above-described embodiment, "the mage processing conforming to the normal photographing mode" or "the image processing optimized for the partial image area" can be selected in each image processing such as the gain correction, the luminance shading correction, or the like. Further, a modification may be made so that in "the partial image area photographing mode" in the above-described embodiment, two kinds of partial image data on "the image processing conforming to the normal photographing mode" and "the image processing optimized for the partial image area" are generated at the same time through one-time photographing.

Furthermore, the electronic camera of the present invention may be a progressive scanning type image pickup device without being limited to the XY address type image pickup device. In this case, if only image signals on a horizontal line containing the partial image area are temporarily read out and thereafter unnecessary image signals on a vertical line are discarded, the same partial readout as in the above-described embodiment can be performed.

The invention is not limited to the above embodiments and various modifications may be made without departing from the spirit and scope of the invention. Any improvement may be made in part or all of the components.

What is claimed is:

1. An electronic camera, comprising:
    an image pickup device which includes a light-receiving plane photoelectrically converting a subject image and allows any random partial image area to be read out from a maximal image area used to generate an image with a maximum number of pixels on the light-receiving plane;
    a partial image area position detecting section which detects positional data on said partial image area with respect to said maximal image area;
    a maximal image correcting value output section which outputs maximal image correcting values that are set based on an entire characteristic of said maximal image area and are used for image processing of image signals of said maximal image area; and
    an image processing section which extracts applied correcting values based on said positional data and performs image processing on image signals of said partial image area by using said applied correcting values, said applied correcting values being correcting values of said maximal image correcting values at a position corresponding to said partial image area.

2. The electronic camera according to claim 1, further comprising:
    a partial image correcting value output section which outputs partial image correcting values that are set based on a characteristic of a selected partial image area and are optimized for image processing of said partial image area; and
    an image processing mode selecting section which selects one of said applied correcting values and said partial image correcting values as correcting values used in said image processing section.

3. The electronic camera according to claim 1, wherein said image processing relates to any of luminance shading correction, line crawling correction, gain correction, gamma correction, and color matrix calculation.

4. The electronic camera according to claim 2, wherein said image processing relates to any of luminance shading correction, line crawling correction, gain correction, gamma correction, and color matrix calculation.

* * * * *